US011876922B2

(12) United States Patent
Ondo et al.

(10) Patent No.: US 11,876,922 B2
(45) Date of Patent: Jan. 16, 2024

(54) METHOD AND DEVICE FOR AUDIO INPUT ROUTING

(71) Applicant: GOOGLE TECHNOLOGY HOLDINGS LLC, Mountain View, CA (US)

(72) Inventors: Kazuhiro Ondo, Buffalo, IL (US); Michael P. Labowicz, Palatine, IL (US); Hideki Yoshino, Lake Zurich, IL (US); Andrew K. Wells, Lindenhurst, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

(21) Appl. No.: 17/833,446

(22) Filed: Jun. 6, 2022

(65) Prior Publication Data

US 2022/0303377 A1 Sep. 22, 2022

Related U.S. Application Data

(63) Continuation of application No. 16/703,003, filed on Dec. 4, 2019, now Pat. No. 11,363,128, which is a
(Continued)

(51) Int. Cl.
*G06F 17/00* (2019.01)
*H04M 1/60* (2006.01)
(Continued)

(52) U.S. Cl.
CPC .......... *H04M 1/6041* (2013.01); *G06F 16/60* (2019.01); *G10L 15/20* (2013.01); *G10L 15/28* (2013.01);
(Continued)

(58) Field of Classification Search
CPC ............... H04M 1/6041; H04M 1/271; H04M 2250/74; G06F 16/60; G10L 15/20; G10L 15/28
(Continued)

(56) References Cited

U.S. PATENT DOCUMENTS 5,553,220 A   9/1996 Keene
5,632,002 A   5/1997 Hashimoto et al.
(Continued)

FOREIGN PATENT DOCUMENTS

EP   1895748   3/2008

OTHER PUBLICATIONS

"AES Standards for Acoustics—Digital Interface for Microphones". Audio Engineering Society, Inc. 2006. Dated Jul. 22, 2008.
(Continued)

*Primary Examiner* — Paul C McCord
(74) *Attorney, Agent, or Firm* — Gray Ice Higdon

(57) ABSTRACT

A method on a mobile device for a wireless network is described. An audio input is monitored for a trigger phrase spoken by a user of the mobile device. A command phrase spoken by the user after the trigger phrase is buffered. The command phrase corresponds to a call command and a call parameter. A set of target contacts associated with the mobile device is selected based on respective voice validation scores and respective contact confidence scores. The respective voice validation scores are based on the call parameter. The respective contact confidence scores are based on a user context associated with the user. A call to a priority contact of the set of target contacts is automatically placed if the voice validation score of the priority contact meets a validation threshold and the contact confidence score of the priority contact meets a confidence threshold.

19 Claims, 7 Drawing Sheets

Related U.S. Application Data continuation of application No. 14/142,190, filed on Dec. 27, 2013, now abandoned.

(60) Provisional application No. 61/889,938, filed on Oct. 11, 2013, provisional application No. 61/857,696, filed on Jul. 23, 2013.

(51) Int. Cl.
  *G06F 16/60* (2019.01)
  *G10L 15/20* (2006.01)
  *G10L 15/28* (2013.01)
  *H04M 1/27* (2006.01)

(52) U.S. Cl.
  CPC ........ *H04M 1/271* (2013.01); *H04M 2250/74* (2013.01)

(58) Field of Classification Search
  USPC ............................................. 700/94
  See application file for complete search history.

(56) References Cited

U.S. PATENT DOCUMENTS

| | | |
|---|---|---|
| 5,950,157 A | 9/1999 | Heck et al. |
| 5,970,446 A | 10/1999 | Goldberg et al. |
| 6,032,115 A | 2/2000 | Kanazawa et al. |
| 6,070,140 A | 5/2000 | Tran |
| 6,449,496 B1 | 9/2002 | Beith et al. |
| 6,496,743 B1 | 12/2002 | Kokkosoulis et al. |
| 6,532,444 B1 | 3/2003 | Weber |
| 6,553,345 B1 | 4/2003 | Kuhn et al. |
| 6,574,599 B1 | 6/2003 | Im et al. |
| 6,587,867 B1 | 7/2003 | Miller et al. |
| 6,704,707 B2 | 3/2004 | Anderson et al. |
| 6,760,704 B1 | 7/2004 | Bennett |
| 6,795,533 B2 | 9/2004 | Erb et al. |
| 6,985,862 B2 | 1/2006 | Strom et al. |
| 7,099,825 B1 | 8/2006 | Cook |
| 7,203,644 B2 | 4/2007 | Anderson et al. |
| 7,523,012 B2 | 4/2009 | Shah et al. |
| 7,526,431 B2 | 4/2009 | Roth et al. |
| 8,009,678 B2 | 8/2011 | Brooke |
| 8,060,373 B2 | 11/2011 | Gibbon et al. |
| 8,374,316 B2 | 2/2013 | Burckart et al. |
| 8,386,250 B2 | 2/2013 | Lloyd et al. |
| 8,411,603 B2 | 4/2013 | Kong |
| 8,433,041 B2 | 4/2013 | Clark et al. |
| 9,100,735 B1 | 8/2015 | Taenzer |
| 9,112,989 B2 | 8/2015 | Lee et al. |
| 2002/0046022 A1 | 4/2002 | Rose et al. |
| 2002/0059068 A1 | 5/2002 | Rose et al. |
| 2002/0082834 A1 | 6/2002 | Eaves et al. |
| 2002/0087320 A1 | 7/2002 | Lee et al. |
| 2003/0187639 A1 | 10/2003 | Mills |
| 2003/0190037 A1 | 10/2003 | Hruska |
| 2004/0043758 A1 | 3/2004 | Sorvari et al. |
| 2004/0268162 A1 | 12/2004 | Morisawa |
| 2005/0049860 A1 | 3/2005 | Junqua et al. |
| 2005/0154596 A1 | 7/2005 | Mochary et al. |
| 2005/0175159 A1 | 8/2005 | Cooper et al. |
| 2005/0177376 A1 | 8/2005 | Cooper et al. |
| 2005/0180464 A1 | 8/2005 | McConnell et al. |
| 2005/0204009 A1 | 9/2005 | Hazarika et al. |
| 2005/0246325 A1 | 11/2005 | Pettinati et al. |
| 2005/0273323 A1 | 12/2005 | Inagaki |
| 2006/0009974 A1 | 1/2006 | Junqua et al. |
| 2006/0035632 A1 | 2/2006 | Sorvari et al. |
| 2006/0053011 A1 | 3/2006 | Kim |
| 2006/0215856 A1 | 9/2006 | Meyer et al. |
| 2007/0043563 A1 | 2/2007 | Comerford et al. |
| 2007/0054686 A1 | 3/2007 | Allen et al. |
| 2007/0060114 A1 | 3/2007 | Ramer et al. |
| 2007/0133826 A1 | 6/2007 | Burk et al. |
| 2007/0239454 A1 | 10/2007 | Paek et al. |
| 2007/0255435 A1 | 11/2007 | Cohen et al. |
| 2008/0019537 A1 | 1/2008 | Nongpiur et al. |
| 2008/0167868 A1 | 7/2008 | Kanevsky et al. |
| 2008/0300025 A1 | 12/2008 | Song et al. |
| 2009/0007159 A1 | 1/2009 | Rangarajan et al. |
| 2009/0037413 A1 | 2/2009 | Castell et al. |
| 2009/0081953 A1 | 3/2009 | Tian et al. |
| 2009/0228513 A1 | 9/2009 | Tian |
| 2009/0287489 A1 | 11/2009 | Savant |
| 2010/0049516 A1 | 2/2010 | Talwar et al. |
| 2010/0057228 A1 | 3/2010 | Kong et al. |
| 2010/0161340 A1 | 6/2010 | Walsh et al. |
| 2010/0169092 A1 | 7/2010 | Backes et al. |
| 2011/0184730 A1 | 7/2011 | LeBeau et al. |
| 2011/0237217 A1 | 9/2011 | Monks et al. |
| 2011/0250932 A1 | 10/2011 | Cohen et al. |
| 2011/0288868 A1 | 11/2011 | Lloyd et al. |
| 2012/0022874 A1 | 1/2012 | Lloyd et al. |
| 2012/0072221 A1 | 3/2012 | White et al. |
| 2012/0148067 A1 | 6/2012 | Petersen et al. |
| 2012/0166186 A1 | 6/2012 | Acero et al. |
| 2013/0110521 A1 | 5/2013 | Hwang et al. |
| 2013/0132072 A1 | 5/2013 | Pradhan et al. |
| 2013/0144618 A1 | 6/2013 | Sun et al. |
| 2013/0325484 A1 | 12/2013 | Chakladar et al. |
| 2013/0339028 A1 | 12/2013 | Rosner et al. |
| 2014/0122378 A1 | 5/2014 | Swaminathan et al. |
| 2014/0156269 A1 | 6/2014 | Lee et al. |
| 2014/0163978 A1 | 6/2014 | Basye et al. |
| 2014/0214429 A1 | 7/2014 | Pantel |
| 2014/0244269 A1 | 8/2014 | Tokutake |
| 2014/0257813 A1 | 9/2014 | Mortensen |
| 2014/0257821 A1 | 9/2014 | Adams et al. |
| 2014/0270260 A1 | 9/2014 | Goertz et al. |
| 2014/0281628 A1 | 9/2014 | Nigam et al. |
| 2014/0331092 A1 | 11/2014 | Taylor et al. |
| 2014/0337036 A1 | 11/2014 | Haiut et al. |
| 2014/0358552 A1 | 12/2014 | Xu |
| 2014/0372122 A1 | 12/2014 | Harsham et al. |
| 2015/0031416 A1 | 1/2015 | Labowicz et al. |
| 2015/0074524 A1 | 3/2015 | Nicholson et al. |
| 2015/0221307 A1 | 8/2015 | Shah et al. |
| 2015/0340042 A1 | 11/2015 | Sejnoha et al. |

OTHER PUBLICATIONS

International Search Report and Written Opinion dated Jan. 20, 2015 in related International Application No. PCT/US2014/047448. 22 Pages, dated Jan. 20, 2015.
AES3—Retrieved from: http://web.archive.org/web/20120816133639/ https://en.wikipedia.org/wiki/AES3 Mar. 9, 2017. 6 Pages.
Use Speech on my phone _ Windows Phone How-to (United States), http://www.windowsphone.com/en-us/how-to/wp8/basics/use-speech-on-my-phone; dated Aug. 13, 2018.

METHOD AND DEVICE FOR AUDIO INPUT ROUTING

TECHNICAL FIELD

The present disclosure relates to processing audio signals and, more particularly, to methods and devices for audio signals including voice or speech.

BACKGROUND

Although speech recognition has been around for decades, the quality of speech recognition software and hardware has only recently reached a high enough level to appeal to a large number of consumers. One area in which speech recognition has become very popular in recent years is the smartphone and tablet computer industry. Using a speech recognition-enabled device, a consumer can perform such tasks as making phone calls, writing emails, and navigating with GPS, strictly by voice.

Speech recognition in such devices is far from perfect, however. When using a speech recognition-enabled device for the first time, the user may need to "train" the speech recognition software to recognize his or her voice. Even after training, however, the speech recognition functions may not work well in all sound environments. An unintended call that is placed may results from inaccurate voice recognition of audio that is captured. Occurrences of these types of calls could result in negative financial, legal and social implications, and may lead to user avoiding the use of a voice recognition system for making calls.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
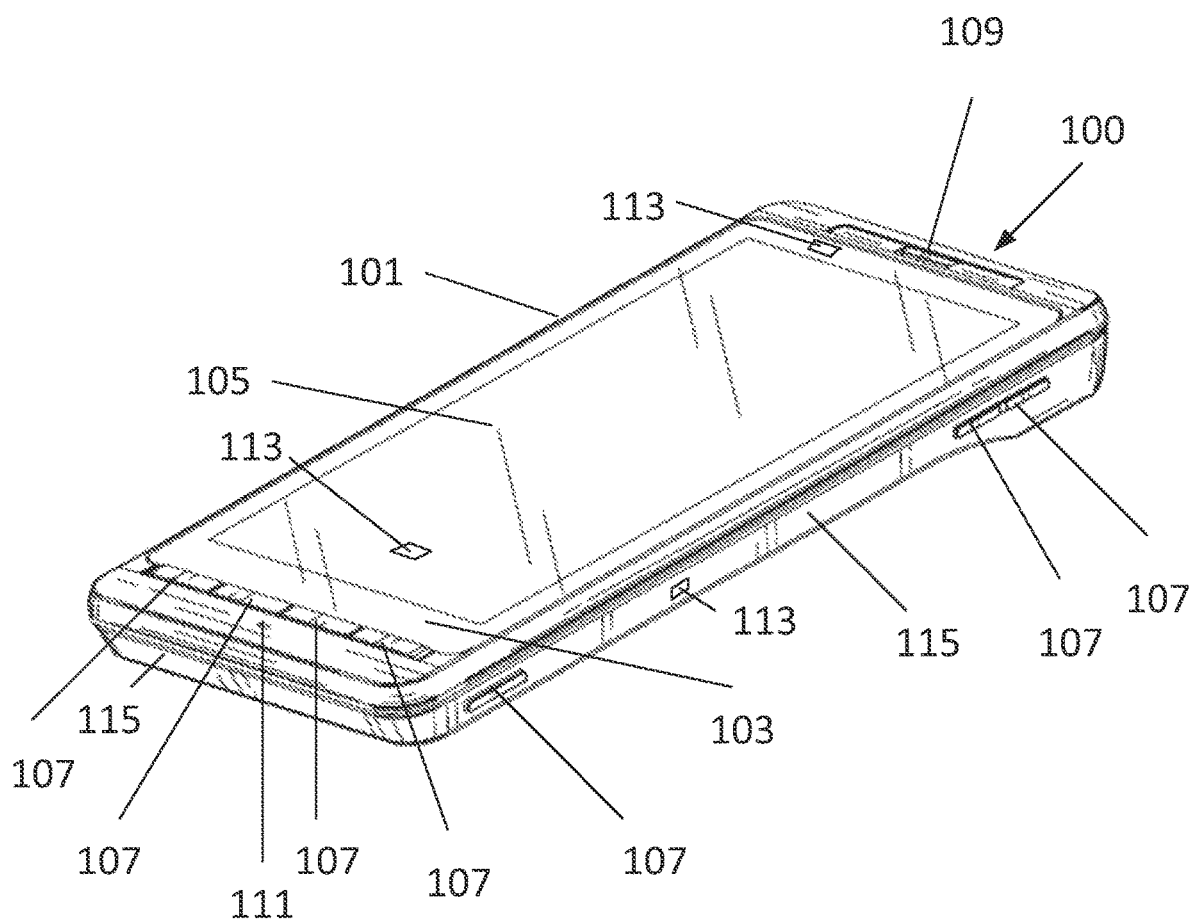
FIG. 1 is a block diagram illustrating a mobile device, according to an embodiment.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Avoidance of placing of unintended calls (e.g., "ghost calls") is particularly relevant for mobile devices that provide an "always on" voice recognition system. In an always-on system, the mobile device may be configured to monitor or listen for a trigger phrase spoken by a user of the mobile device, followed by a command phrase. Trigger phrases spoken by the user, such as "OK, Google Now" may be previously "learned" in a training session for the mobile device; however, the trigger phrase may be incorrectly identified due to various factors, such as background noise or obstructions between the user and the mobile device.

Validation of the command phrase allows for a reduction in the placement of unintended calls. The command phrase for placing a call includes a call command and a call parameter. As one example, the mobile device may detect "OK Google Now, Call Bob on his cell phone." In this case, "OK Google Now" is the trigger phrase, "Call" is the call command, and "Bob on his cell phone" is the call parameter. As another example, the mobile device may detect "OK Google Now, Call Charlie." In this case, the trigger phrase and call command are the same as the previous example, but the call parameter is simply "Charlie." As a third example, the mobile device may detect "OK Google Now, Dial 1-800-555-1234." In this case, "OK Google Now" is the trigger phrase, "Dial" is the call command, and "1-800-555-1234" is the call parameter.

The various embodiments described herein allow a mobile device to validate the command phrase for placing a call. For example, if the call parameter is readily recognized as "Charlie", the mobile device may validate the command phrase by searching an address book. If the address book includes a frequently called contact with a name of "Charlie", the mobile device may automatically place a call to that contact without further action by the user. Alternatively, if the call parameter is recognized as spoken digits such as "1-800-555-1234", the mobile device may validate the digits against a phone numbering plan prior to placing the call.

In one embodiment, a set of target contacts are selected based on respective voice validation scores and respective contact confidence scores. A phone call is automatically placed to a priority contact if a voice validation score and contact confidence score for the priority contact meet a validation threshold.

In another embodiment, numeric digits detected in a command phrase are validated as a phone number against a predetermined numbering plan. A call is automatically placed to the phone number if the phone number is validated.

Referring to FIG. 1, there is illustrated a perspective view of an example mobile device 100. The mobile device 100 may be any type of device capable of storing and executing multiple applications. Examples of the mobile device 100 include, but are not limited to, mobile devices, smart phones, smart watches, wireless devices, tablet computing devices, personal digital assistants, personal navigation devices, touch screen input device, touch or pen-based input devices, portable video and/or audio players, and the like. It is to be understood that the mobile device 100 may take the form of a variety of form factors, such as, but not limited to, bar, tablet, flip/clam, slider, rotator, and wearable form factors.

For one embodiment, the mobile device 100 has a housing 101 comprising a front surface 103 which includes a visible display 105 and a user interface. For example, the user interface may be a touch screen including a touch-sensitive surface that overlays the display 105. For another embodiment, the user interface or touch screen of the mobile device 100 may include a touch-sensitive surface supported by the housing 101 that does not overlay any type of display. For yet another embodiment, the user interface of the mobile device 100 may include one or more input keys 107.

Examples of the input key or keys 107 include, but are not limited to, keys of an alpha or numeric keypad or keyboard, a physical keys, touch-sensitive surfaces, mechanical surfaces, multipoint directional keys and side buttons or keys 107. The mobile device 100 may also comprise a speaker 109 and microphone 111 for audio output and input at the surface. It is to be understood that the mobile device 100 may include a variety of different combination of displays and interfaces.

The mobile device 100 includes one or more sensors 113 positioned at or within an exterior boundary of the housing 101. For example, as illustrated by FIG. 1, the sensor or sensors 113 may be positioned at the front surface 103 and/or another surface (such as one or more side surfaces 115) of the exterior boundary of the housing 101. The sensor or sensors 113 may include an exterior sensor supported at the exterior boundary to detect an environmental condition associated with an environment external to the housing. The sensor or sensors 113 may also, or in the alternative, include an interior sensors supported within the exterior boundary (i.e., internal to the housing) to detect a condition of the device itself. Examples of the sensors 113 are described below in reference to FIG. 2.

Figure 2:
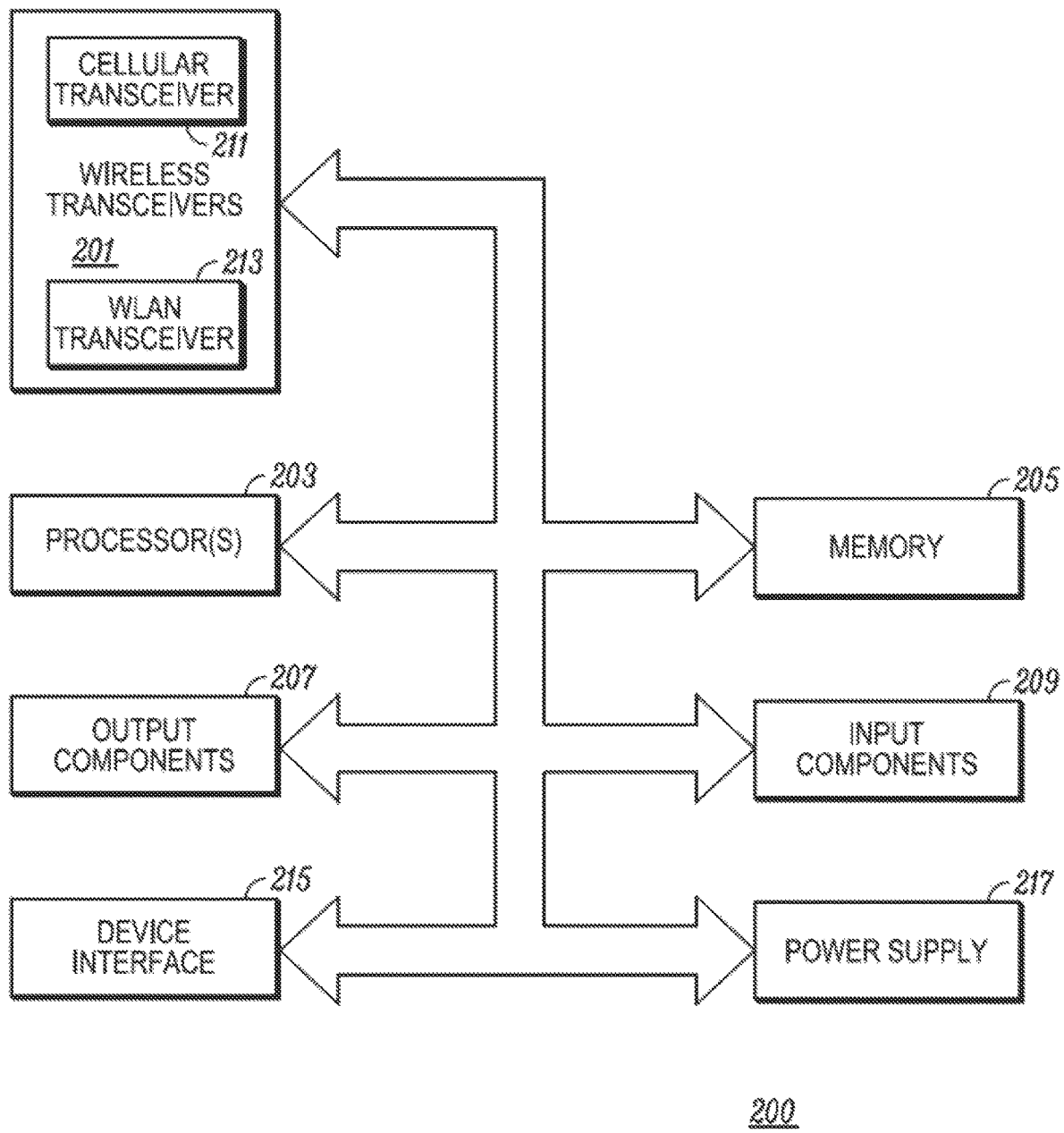
FIG. 2 is a block diagram of example components of a mobile device, according to an embodiment.

Referring to FIG. 2, a block diagram representing example components 200 that may be used for one or more embodiments is shown. The example components may include one or more communication components 201, one or more processors 203, one or more memories 205, one or more output components 207, and one or more input components 209. Each component may include a user interface that comprises one or more input components 209. Each communication component 201 may include a wireless receiver, transmitter or transceiver. Each communication component 201 may utilize wireless technology for communication, such as, but are not limited to, cellular-based communications such as analog communications (using AMPS), digital communications (using CDMA, TDMA, GSM, iDEN, GPRS, or EDGE), and next generation communications (using UMTS, WCDMA, LTE, or IEEE 802.16) and their variants, as represented by cellular transceiver 211. Each communication component 201 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology, as represented by WLAN transceiver 213. Also, each communication component 201 may be a receiver, a transmitter or both.

The example components 200 may further include a device interface 215 to provide a direct connection to auxiliary components or accessories for additional or enhanced functionality. In addition, the example components 200 may include a power source or supply 217, such as a portable battery, for providing power to the other example components and allow portability of the mobile device 100.

The processor 203 may generate commands based on information received from one or more communication components 201 and/or one or more input components 209. The processor 203 may process the received information alone or in combination with other data, such as the information stored in the memory 205. Thus, the memory 205 of the example components 200 may be used by the processor 203 to store and retrieve data. The data that may be stored by the memory 205 include, but is not limited to, operating systems, applications, and data. Each operating system includes executable code that controls basic functions of the mobile device, such as interaction among the components of the example components 200, communication with external devices via each communication component 201 and/or the device interface (see below), and storage and retrieval of applications and data to and from the memory 205. The memory 205 includes multiple applications, and each application includes executable code utilizes an operating system to provide more specific functionality for the mobile device. Data is non-executable code or information that may be referenced and/or manipulated by an operating system or application for performing functions of the mobile device.

The input components 209, such as components of the user interface, may produce an input signal in response to detecting a predetermined gesture at a first input component 219, such as a gesture sensor. An example of a gesture sensor is, but not limited to, a touch-sensitive sensor having a touch-sensitive surface substantially parallel to the display. The touch-sensitive sensor may include at least one of a capacitive touch sensor, a resistive touch sensor, an acoustic sensor, an ultrasonic sensor, a proximity sensor, or an optical sensor.

The input components 209 may also include other sensors, such as the visible light sensor, the motion sensor and the proximity sensor described above. Likewise, the output components 207 of the example components 200 may include one or more video, audio and/or mechanical outputs. For example, the output components 207 may include a video output component such as a cathode ray tube, liquid crystal display, plasma display, incandescent light, fluorescent light, front or rear projection display, and light emitting diode indicator. Other examples of output components 207 include an audio output component such as a speaker, alarm and/or buzzer, and/or a mechanical output component such as vibrating or motion-based mechanisms.

It is to be understood that FIG. 2 is provided for illustrative purposes only and for illustrating components of a mobile device in accordance with the present invention, and is not intended to be a complete schematic diagram of the various components required for a mobile device. Therefore, a mobile device may include various other components not shown in FIG. 2, or may include a combination of two or more components or a division of a particular component into two or more separate components, and still be within the scope of the present invention.

Figure 3:
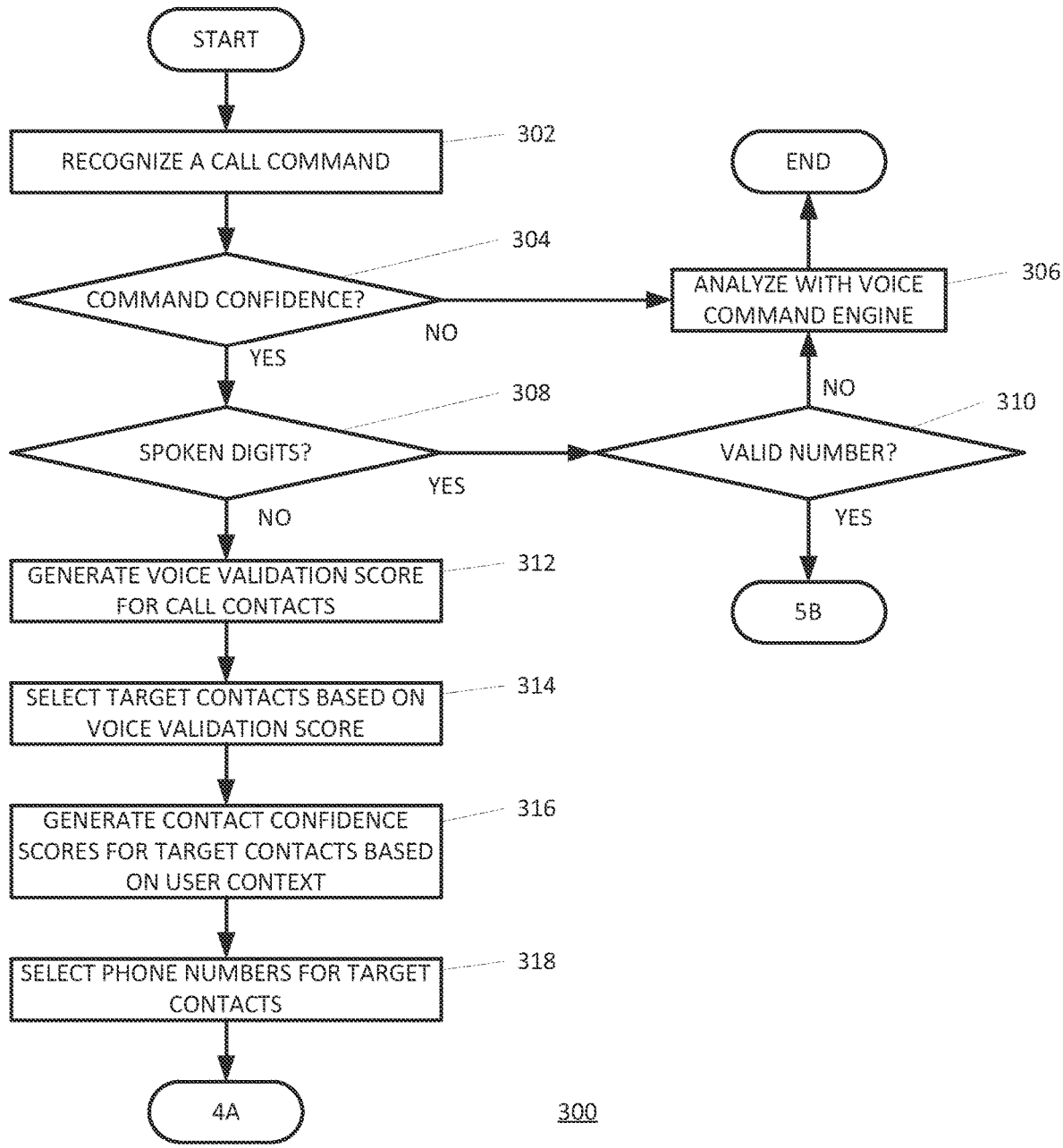
FIG. 3, FIG. 4, and FIG. 5 illustrate a process flow of a method for validating a command phrase that may be performed by the mobile device of FIG. 1, according to an embodiment.
Figure 4:
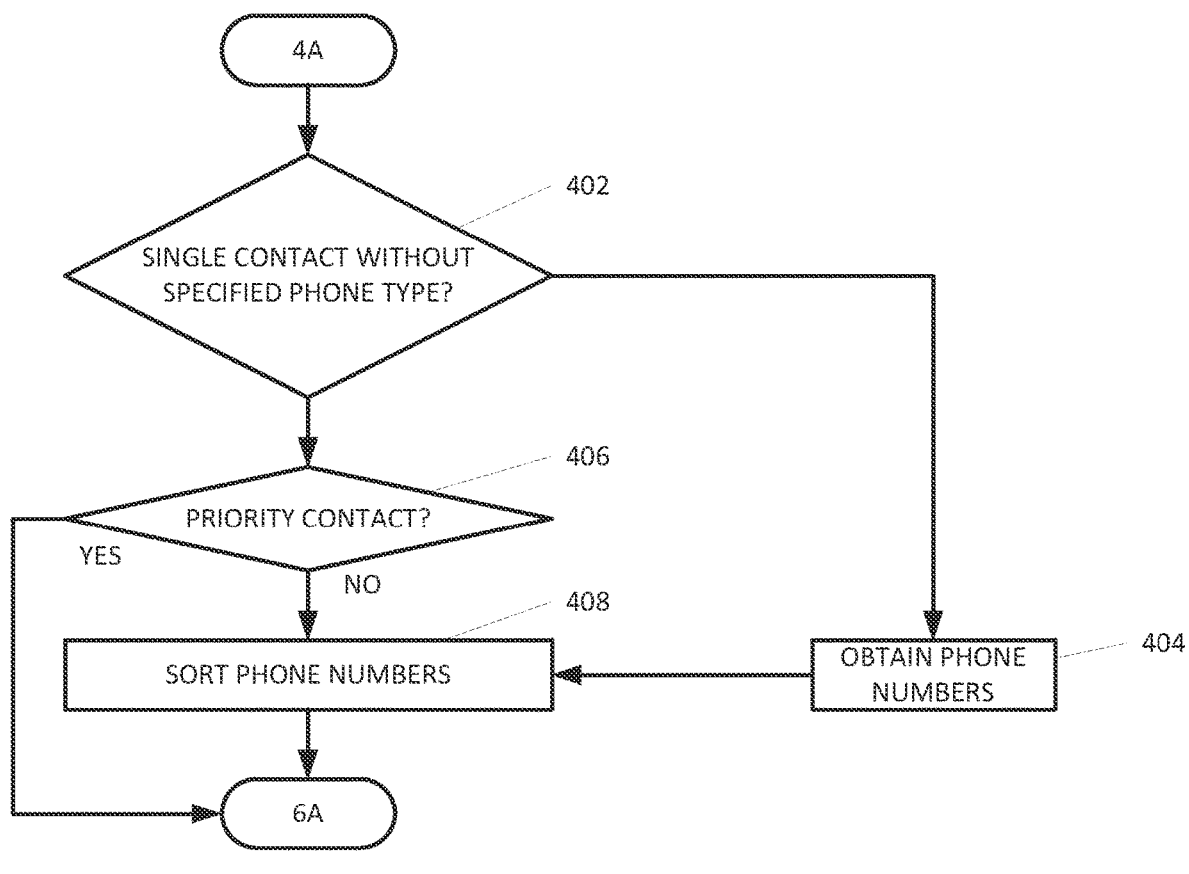
Figure 5:
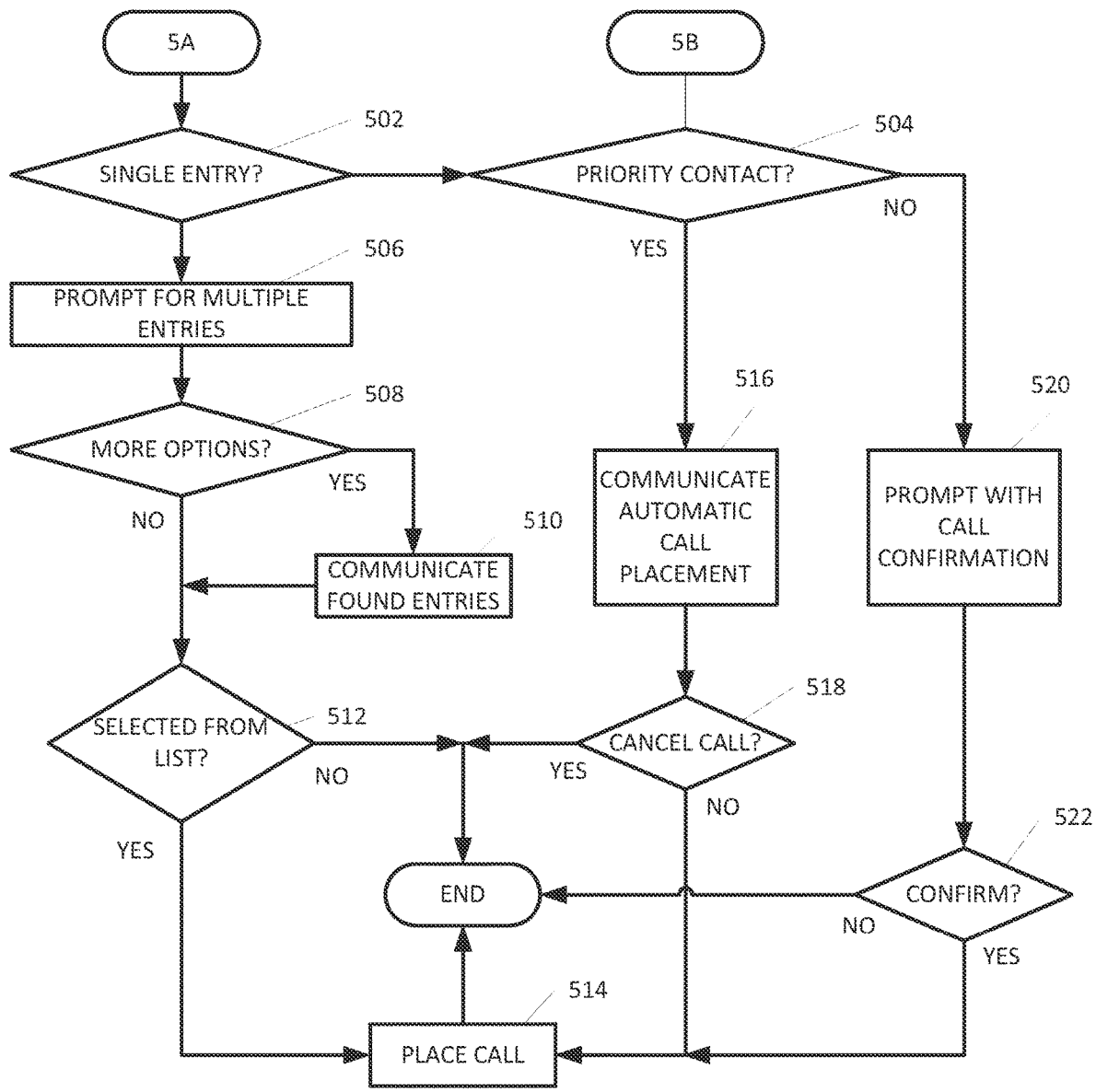

Turning to FIGS. 3, 4, and 5, process flows 300, 400, and 500 illustrate an embodiment of a method for validation of a command phrase that may be performed by the mobile device 100. As a user of the mobile device 100 is speaking, the mobile device 100 monitors an audio input, such as an audio input from the microphone 111. Upon detection of a trigger phrase (e.g., "OK Google Now"), the mobile device 100 stores a command phrase that follows the trigger phrase. The command phrase or a portion thereof in one example is buffered in the memory 205 and provided to the processor 203. In another example, the command phrase is provided directly to the processor 203. The mobile device 100 determines whether the command phrase includes a call command for a current call. Examples of a call command include "Call", "Dial", "Place a call to", and other words or phrases that will be apparent those skilled in the art. The call commands in one example are included in a call command whitelist.

When the mobile device 100 recognizes (302) a call command, the mobile device 100 determines a command confidence score for the call command. In one example, the mobile device 100 analyzes the command phrase or a portion thereof (e.g., only the call command) with a voice recognition engine, such as those provided by Nuance (Nuance Communications, Inc; Burlington, MA), or other processing algorithm to determine the command confidence score. The command confidence score in this case is a numerical value (e.g., between 0 and 100 with 100 being most confident) that indicates a relative confidence level of the detection of a call command. The mobile device 100 in one example provides the call command whitelist and the call command to the voice recognition engine to receive the command confidence score. Alternatively, the call command whitelist may be provided to the voice recognition engine prior to the call command (e.g., during installation, configuration, initialization, etc.). The mobile device 100 determines (304) whether the command confidence score meets a command threshold (e.g., is greater than or equal to 40). In alternative embodiments, the command confidence score is determined or received as a valid or invalid indication, or a tiered response indication (e.g., high confidence, medium confidence, low confidence). Other implementations of the command confidence score will be apparent to those skilled in the art.

In addition to determining (304) the command confidence score, the mobile device 100 may also compare the call command to a list of predetermined words or phrases that may be misidentified as call commands. For example, the mobile device 100 may use a blacklist of words or phrases such as "How tall is . . . " or "denial" which may be misidentified as "Call" or "Dial", respectively. If the command phrase is a closer match to the blacklist phrase than to a legitimate call command (e.g., on the whitelist), then the mobile device 100 proceeds to step 306. Additionally, the mobile device 100 may determine whether the command phrase is located in the middle of a conversation. In this case, the mobile device 100 determines whether an audio length of the command phrase is longer than a predetermined threshold, such as five seconds, to prevent an attempt to validate a user's conversation. The mobile device 100 invalidates the call command if the audio length exceeds the predetermined threshold and proceeds to step 306.

If the command threshold is not met (NO at 304), the mobile device 100 analyzes (306) the command phrase with a voice command engine (e.g., engines provided by Google Now, Sensory, or Nuance), for example, to provide general command recognition instead of call command validation. In this case, the command confidence score indicates that the call command may have been incorrectly identified. For example, if the command phrase is "How tall is Mount Everest?", "How tall is" may be recognized as a blacklist phrase, but additional processing by the voice command engine may allow a response to be provided.

If the command threshold is met (YES at 304), the mobile device 100 determines (308) whether the call parameter includes spoken digits (e.g., "1-800-555-1234"). If spoken digits are detected (YES at 308), the mobile device 100 validates (310) the spoken digits (e.g., the call parameter) against a predetermined phone numbering plan. Examples of phone numbering plans include the North American Numbering Plan, E.164, satellite phone number plans, or private numbering plans (e.g., for a private branch exchange). The mobile device 100 in one example selects a numbering plan based on its current geographic location (e.g., North America or Europe). In another example, the numbering plan includes a blacklist of phone numbers. The blacklist includes phone numbers that should not be automatically dialed, such as emergency response numbers (e.g., 9-1-1), international phone numbers, or phone numbers that may incur additional fees. The blacklist may be populated by a wireless service provider, government entity, or by the user of the mobile device 100. If the call parameter is not validated (NO at 310), the mobile device 100 proceeds to step 306. If the call parameter is validated and thus contains a phone number (YES at 310), the mobile device 100 proceeds to step 504 (FIG. 5). Optionally, the mobile device 100 determines a voice validation score for the phone number that indicates a relative confidence level of the detection of phone number (e.g., to avoid mistaken detections such as detecting a "five" as a "nine"). The mobile device 100 uses the voice recognition engine for determination of the voice validation score.

If spoken digits are not detected (NO at 308), the mobile device 100 validates the call parameter against a set of call contacts, such as an address book associated with the mobile device 100. The mobile device 100 generates (312) a set of voice validation scores that correspond to the set of call contacts in the address book. The voice validation scores indicate a relative confidence level of the detection of the corresponding contact's spoken name. In one example, the mobile device 100 provides the set of call contacts to the voice recognition engine along with the call parameter. The set of call contacts may be provided to the voice recognition engine prior to the call parameter (e.g., during installation, configuration, initialization, etc.). The set of voice validation scores in one example are numerical values (e.g., 0 to 100). In alternative embodiments, the voice validation score received as a valid or invalid indication, or a tiered response indication (e.g., high confidence, medium confidence, low confidence). Other implementations of the voice validation score will be apparent to those skilled in the art.

The mobile device 100 selects (314) a set of target contacts from the set of call contacts based on the voice validation scores. For example, the mobile device 100 selects only those contacts with a voice validation score within a selected range of a highest voice validation score. As one example, the user may have call contacts in his address book including Andrea, Brad, Brent, and Charlie. In this case, if the user speaks "OK Google Now, Call Brent at his home", the voice validation scores may be 0, 85, 95, and 0, respectively. If the selected range is 10, the target contacts are Brad and Brent (Brent having the highest voice validation score of 95). If the selected range is 5, the target contact is only Brent. The selected range may be predetermined or dynamically determined by the mobile device 100 (e.g., based on prior voice recognition history). In alternative implementations, the selected range may include "high confidence" voice validation scores or both "high confidence" and "medium confidence" scores. Other selected ranges will be apparent to those skilled in the art, for example, based on the type of voice validation score used.

Once the set of target contacts have been selected (e.g., those with a sufficiently high voice validation score), the mobile device 100 generates a contact confidence score for the target contacts. The contact confidence scores indicate a relative importance of the corresponding contact to the user of the mobile device 100 and may be a numbered value (e.g., 0 to 100), a ranked list, or other relative indicator for comparison of the contacts. The mobile device 100 in one example generates the contact confidence scores for each of the set of target contacts based on a user context associated with the user. The user context of a contact includes one or more of a recency of last communication (e.g., phone calls, text messages, emails, etc.), frequency of communication, placement on a "favorites list" by the user, relation to a calendar event or appointment (e.g., a current calendar event of "Call Brent at 10:00 AM"), or other contextual indicators as will be apparent to those skilled in the art.

In an alternative implementation, the mobile device 100 generates the contact confidence scores prior to recognizing (312) the call command. For example, the mobile device 100 may use a context engine that analyzes the user context to update contact confidence scores on a schedule-driven basis (e.g., a predetermined schedule or dynamic schedule) or on an event-driven basis (e.g., when a communication is sent to a contact). In this case, the mobile device 100 (e.g., the context engine) may maintain a "VIP" list of contacts with their respective contact confidence scores. The context engine in one example is an application or service that is executed by the mobile device 100.

The mobile device 100 selects (318) respective phone numbers for the set of target contacts. As one example where the call parameter is "Brent at his home", the mobile device 100 detects a phone type specified within the call parameter, such as "at his home". The mobile device 100 in one example uses a whitelist of words or phrases that specify phone types, such as for a cell or mobile phone, home phone, business phone, or others as will be apparent to those skilled in the art. As another example, the call parameter may not include a phone type and simply identify a contact (e.g., "Call Brent").

The mobile device 100 selects a most likely phone number based on the specified phone type (if available) and the user context. In one example, the mobile device 100 queries the context engine with the specified phone type to receive the most likely phone number. If the specified phone type is not available or if no phone number is received from a query with the specified phone type (e.g., "at his home" but no home phone number is listed in the contact), the mobile device 100 queries without the phone type specified. In this case, the context engine may provide a most likely number based on user context or selected from a predetermined priority order as available (e.g., mobile phone as highest priority, then home, then work). Where the user context is not available for a contact or if the contact is not on the VIP list, the mobile device 100 selects the phone number based on the predetermined priority order.

Referring to FIG. 4, after selection (318) of the phone numbers, the mobile device 100 determines (402) whether the set of target contacts contains only a single contact without a specified phone type. In this case (YES at 402), the mobile device 100 obtains each of the phone numbers stored (e.g., in the address book) for the single contact and proceeds to step 408. If the set of target contacts contains more than one contact or has a specified phone type, the mobile device 100 determines (406) whether a priority contact for the current call has been found, based on the voice validation score, the contact confidence score, or a combination thereof. In one example, a priority contact is a contact with a voice validation score that meets a validation threshold (e.g., at least 60), a contact confidence score that meets a confidence threshold (e.g., at least 60), or with both thresholds met. In another example, the mobile device 100 uses a weighting algorithm based on the voice validation score and contact confidence score to provide a higher likelihood of "priority" status for a contact on the VIP list. If the validation and confidence thresholds are met and a priority contact is found, the mobile device 100 proceeds to step 502 (FIG. 5).

If a priority contact is not found (NO at 406), or after obtaining (404) the phone numbers, the mobile device 100 sorts the target contacts and phone numbers. The mobile device 100 in one example sorts the contacts and numbers using a weighting algorithm based on the voice validation score and contact confidence score. After sorting, the mobile device 100 proceeds to step 502 (FIG. 5).

Referring to FIG. 5, the mobile device 100 determines (502) whether the set of target contacts contains a single entry (e.g., a single contact with a single selected phone number). If a single entry is not found (NO at 502), the mobile device 100 prompts (506) the user to indicate that multiple entries (e.g., multiple target contacts or multiple phone numbers) have been found. The communication (506) in one example is a notification that multiple entries have been found and a prompt for further input. In another example, the communication is a list of the multiple entries (or a portion thereof).

The mobile device 100 communicates the multiple entries by a visual interface (e.g., on the display 105), a text-to-speech interface (e.g., via the speaker 109), or a combination thereof. In one example, the mobile device 100 communicates only a portion of the multiple entries selected based on their relative voice validation scores or contact confidence scores. In a further example, the communication includes a prompt for the user to select one or more user interface options, such as communicating all of the entries found, sequentially listing the entries, or selecting an entry for placement of the current call. If the user selects an option for communicating the entries (YES at 508), the mobile device 100 communicates (510) the found entries (e.g., contacts or phone numbers) via the visual or text-to-speech interface.

The mobile device 100 determines (512) whether an entry has been selected by the user. Upon selection of an entry (YES at 512), the mobile device 100 places (514) a call to the selected entry. If the user does not select an entry within a predetermined timeout period such as five seconds (NO at 512), the process ends for the current call.

If a single entry is found (YES at 502), or if a valid phone number is found (YES at 310), the mobile device 100 determines (504) whether the single entry is a priority contact based on the voice validation score, the contact confidence score, or a combination thereof. As described above, a priority contact may be a contact with a voice validation score that meets the validation threshold or a contact confidence score that meets the contact threshold. The mobile device 100 may determine that a valid phone number (YES at 310) is a priority contact if the corresponding voice validation score meets the validation threshold. However, other thresholds may be used at step 504 for determination of the priority contact. In one example, the mobile device 100 dynamically determines at least one of the validation threshold or contact threshold based on a device context for the mobile device 100. In this case, the mobile device 100 selects a higher threshold when the mobile device 100 is currently stowed (e.g., in a pocket or bag), the user is currently driving, the user is currently in a meeting, whether a headset (e.g., Bluetooth or wired headset) is currently connected, or other criteria, as will be apparent to those skilled in the art.

Upon determination that a priority contact has been found (YES at 504), the mobile device 100 communicates (516) that an automatic call placement is (or will) take place, for example, via the visual or text-to-speech interface (e.g., "Calling Brent at home"). This provides an opportunity for the user to cancel the call prior to automatic placement of the call. The mobile device 100 determines (518) whether the user has canceled the call, for example, within a predetermined timeout period (e.g., four seconds). If the user cancels the call (YES at 518), for example, via a spoken command ("Cancel") or other interaction with the mobile device 100, the process ends for the current call. If the user does not cancel the call (NO at 518), the mobile device 100 automatically places the call to the priority contact.

If a priority contact has not been found (NO at 504), the mobile device 100 prompts (520) the user with a call confirmation via the visual or text-to-speech interface (e.g., "Should I call Brent at home?" or "Press here to place call"). The mobile device 100 determines (522) whether the user has confirmed the call, for example, within a predetermined timeout period (e.g., ten seconds). If the user confirms the call (YES at 522), for example, via a spoken command ("Yes") or other interaction with the mobile device 100, the mobile device 100 places (514) the call. If the user does not confirm the call (NO at 522), the process ends for the current call.

Figure 6:
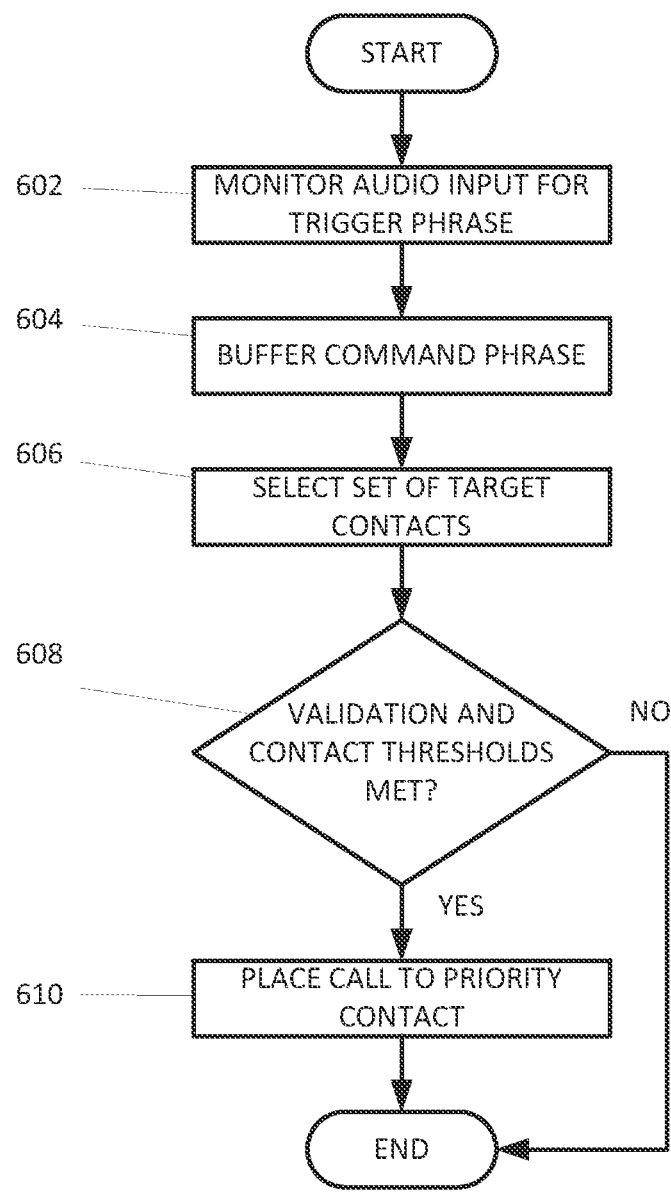
FIG. 6 is a process flow of a method for automatically dialing a priority contact that may be performed by the mobile device of FIG. 1, according to an embodiment.

Turning to FIG. 6, a process flow 600 for automatically dialing a priority contact that may be performed by the mobile device 100 is shown. The mobile device 100 monitors (602) an audio input (e.g., the microphone 111) for a trigger phrase spoken by a user of the mobile device 100. In one example, the mobile device 100 performs the monitoring in a low power mode, such as with a low power digital signal processor while an application processor is in a low power state. The mobile device 100 buffers (604) a command phrase spoken by the user after the trigger phrase (604). The command phrase corresponds to a call command and a call parameter. The mobile device 100 in one example wakes from the low power mode (e.g., wakes the application processor) upon detection of the trigger phrase and buffers the command phrase while the application processor is initialized. The mobile device 100 selects (606) a set of target contacts associated with the mobile device based on respective voice validation scores and respective contact confidence scores. The respective voice validation scores are based on the call parameter and the respective contact confidence scores are based on a user context associated with the user. The mobile device 100 determines (608) whether the voice validation score and contact confidence score for a priority contact meet corresponding validation and contact thresholds. The mobile device 100 automatically places (610) the call to the priority contact if the thresholds are met (YES at 608).

Figure 7:
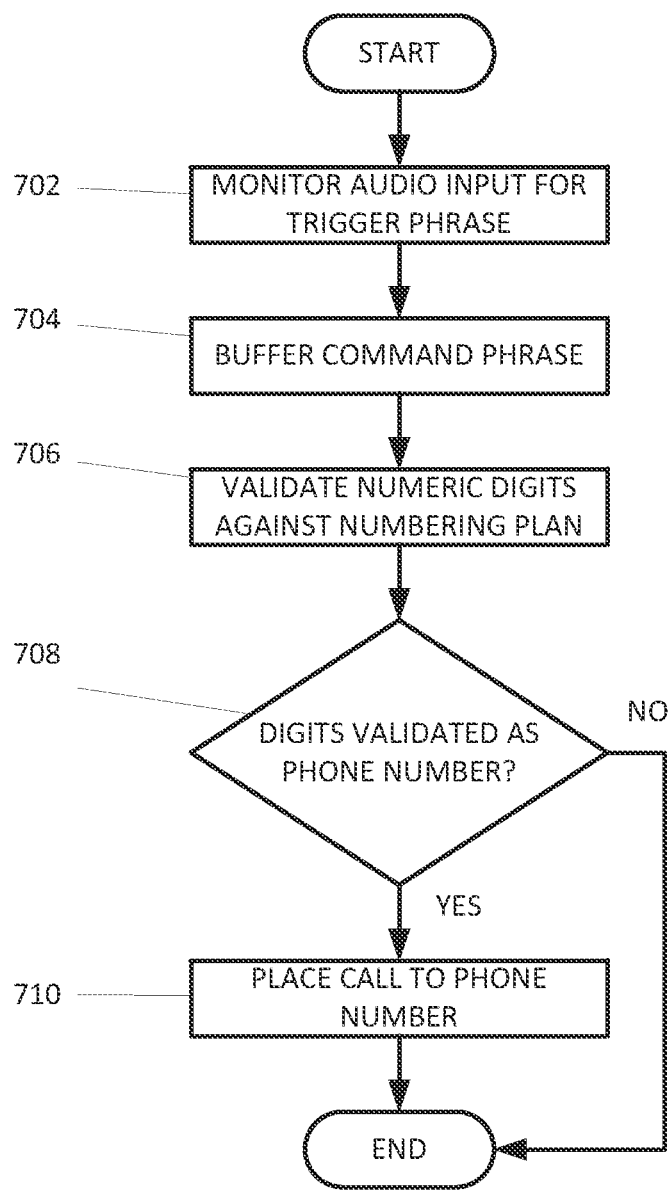
FIG. 7 is a process flow of a method for automatically dialing a phone number that may be performed by the mobile device of FIG. 1, according to an embodiment.

Turning to FIG. 7, a process flow 700 for automatically dialing a phone number that may be performed by the mobile device 100 is shown. The mobile device 100 monitors (702) an audio input (e.g., the microphone 111) for a trigger phrase spoken by a user of the mobile device 100. In one example, the mobile device 100 performs the monitoring in a low power mode, such as with a low power digital signal processor while an application processor is in a low power state. The mobile device 100 buffers (704) a command phrase spoken by the user after the trigger phrase (604). The command phrase corresponds to a call command and a call parameter. The mobile device 100 in one example wakes from the low power mode (e.g., wakes the application processor) upon detection of the trigger phrase and buffers the command phrase while the application processor is initialized. If numeric digits are detected in the call parameter, the mobile device 100 validates (706) the numeric digits as a phone number against a predetermined phone numbering plan. If the digits are validated (YES at 708), the mobile device 100 automatically places (710) a call to the phone number.

It can be seen from the foregoing that a method and system for validation of a command phrase for placing a call have been described. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The apparatus described herein may include a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

The disclosed embodiments may be described in terms of functional block components and various processing steps. Such functional blocks may be realized by any number of hardware and/or software components configured to perform the specified functions. For example, the disclosed embodiments may employ various integrated circuit components, e.g., memory elements, processing elements, logic elements, look-up tables, and the like, which may carry out a variety of functions under the control of one or more microprocessors or other control devices. Similarly, where the elements of the disclosed embodiments are implemented using software programming or software elements, the disclosed embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosed embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", "device", "controller", and "construction" are used broadly and are not limited to mechanical or physical embodiments, but may include software routines in conjunction with processors, etc.

No item or component is essential to the practice of the disclosed embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the disclosed embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the disclosed embodiments and does not pose a limitation on the scope of the disclosed embodiments unless otherwise claimed. Numerous modifications and adaptations will be readily apparent to those of ordinary skill in this art.

What is claimed is:

1. A method implemented by one or more processors of a device, the method comprising:
    monitoring an audio input for an occurrence of a trigger phrase that is spoken by a user of the device while the device is in a low power mode;
    in response to detecting the occurrence of the trigger phrase:
        waking the device from the low power mode; and
        buffering the audio input while the device wakes up from the low power mode; and
        in response to the device waking up from the low power mode, monitoring the buffered audio input for an occurrence of a command phrase that is spoken by the user, wherein the command phrase corresponds to a call command and a call parameter;
    in response to detecting the occurrence of the command phrase:
        selecting a set of target contacts associated with the device based on respective voice validation scores and respective contact confidence scores, wherein the respective voice validation scores indicate a corresponding likelihood that the call parameter is associated with a corresponding target contact, included in the set of target contacts, and wherein the respective contact confidence scores indicate a corresponding additional likelihood that a user context associated with the user for the call action being directed to the corresponding target contact, included in the set of target contacts; and
        in response determining that a given voice validation score, of the respective voice validation scores, for a priority contact, included in the set of target contacts, meets a validation threshold and in response to determining that a given contact confidence score, of the respective contact confidence scores, for the priority contact, included in the set of target contacts, meets a confidence threshold:
            automatically placing a call to the priority contact.

2. The method of claim 1, wherein selecting the set of target contacts comprises:
    generating a set of voice validation scores that correspond to a set of call contacts associated with the device based on the command phrase; and
    selecting the set of target contacts, from the set of call contacts, with a corresponding one of the respective voice validation scores within a selected range of a highest voice validation score of the set of voice validation scores.

3. The method of claim 2, wherein generating the set of voice validation scores comprises:
    providing the set of call contacts to a voice recognition engine;
    providing the call parameter to the voice recognition engine; and
    receiving the set of voice validation scores from the voice recognition engine.

4. The method of claim 2, further comprising:
    generating a set of contact confidence scores as the respective contact confidence scores, for each of the corresponding target contacts included in the set of target contacts, based on the user context associated with the user, wherein the user context comprises one or more of: a recency of last communication, frequency of communication, placement on a favorites list by the user, or relation to a calendar event or appointment for the user; and
    selecting respective phone numbers for each of the corresponding target contacts included in the set of target contacts.

5. The method of claim 4, wherein automatically placing the call to the priority contact comprises:
    determining whether only a single contact of the set of target contacts has the given voice validation score that meets the validation threshold and the given contact confidence score that meets the confidence threshold; and
    automatically placing the call to the phone number for the single contact as the priority contact.

6. The method of claim 4, further comprising:
    selecting a set of phone numbers that correspond to a single contact, included in the set of target contacts, if the set of target contacts has only the single contact as the priority contact;
    automatically placing the call to a single phone number if:
        the single contact has only the single phone number,
        the given voice validation score of the single contact meets the validation threshold, and
        the given contact confidence score of the single contact meets the confidence threshold; and
    prompting the user to enter the single phone number if:
        the single contact has only the single phone number but the given voice validation score of the single contact does not meet the validation threshold, or
        the given contact confidence score of the single contact does not meet the confidence threshold.

7. The method of claim 4, further comprising:
    sorting the set of target contacts based on the set of contact confidence scores and the set of voice validation scores;
    prompting the user to select the priority contact from the set of target contacts if the set of target contacts has more than one target contact.

8. The method of claim 1, further comprising:
    validating the call command based on an audio length of the command phrase.

9. A device comprising:
at least one processor; and
memory storing instructions that, when executed, cause the at least one processor of the device to:
monitor an audio input for an occurrence of a trigger phrase that is spoken by a user of the device while the device is in a low power mode;
in response to detecting the occurrence of the trigger phrase:
wake the device from the low power mode; and
buffer the audio input while the device wakes up from the low power mode; and
in response to the device waking up from the low power mode, monitor the buffered audio input for an occurrence of a command phrase that is spoken by the user, wherein the command phrase corresponds to a call command and a call parameter;
in response to detecting the occurrence of the command phrase:
select a set of target contacts associated with the device based on respective voice validation scores and respective contact confidence scores, wherein the respective voice validation scores indicate a corresponding likelihood that the call parameter is associated with a corresponding target contact, included in the set of target contacts, and wherein the respective contact confidence scores indicate a corresponding additional likelihood that a user context associated with the user for the call action being directed to the corresponding target contact, included in the set of target contacts; and
in response determining that a given voice validation score, of the respective voice validation scores, for a priority contact included in the set of target contacts, meets a validation threshold and in response to determining that a given contact confidence score, of the respective contact confidence scores, for the priority contact, included in the set of target contacts, meets a confidence threshold:
automatically place a call to the priority contact.

10. The device of claim 9, wherein the instructions to select the set of target contacts comprise instructions to:
generate a set of voice validation scores that correspond to a set of call contacts associated with the device based on the command phrase; and
select the set of target contacts, from the set of call contacts, with a corresponding one of the respective voice validation scores within a selected range of a highest voice validation score of the set of voice validation scores.

11. The device of claim 10, wherein the instructions the generate the set of voice validation scores comprise instructions to:
provide the set of call contacts to a voice recognition engine;
provide the call parameter to the voice recognition engine; and
receive the set of voice validation scores from the voice recognition engine.

12. The device of claim 10, wherein the instructions further cause the at least one processor of the device to:
generate a set of contact confidence scores as the respective contact confidence scores, for each of the corresponding, for each of the corresponding target contacts included in the set of target contacts, based on the user context associated with the user, wherein the user context comprises at least one of a call history or a favorite contact list; and
select respective phone numbers for each of the corresponding target contacts included in the set of target contacts.

13. The device of claim 12, wherein the instructions to automatically place the call comprise instructions to:
determine whether only a single contact of the set of target contacts, has the given voice validation score that meets the validation threshold and the given contact confidence score that meets the confidence threshold; and
automatically place the call to the phone number for the single contact as the priority contact.

14. The device of claim 12, wherein the instructions further cause the at least one processor of the device to:
select a set of phone numbers that correspond to a single contact, included in the set of target contacts, if the set of target contacts has only the single contact as the priority contact;
automatically place the call to a single phone number if:
the given single contact has only the single phone number,
the given voice validation score of the single contact meets the validation threshold, and
the contact confidence score of the single contact meets the confidence threshold; and
prompt the user to place the call to the single phone number if:
the single contact has only the single phone number but the given voice validation score of the single contact does not meet the validation threshold, or
the given contact confidence score of the single contact does not meet the confidence threshold.

15. The device of claim 12, wherein the instructions further cause the at least one processor of the device to:
sort the set of target contacts based on the set of contact confidence scores and the set of voice validation scores; and
prompt the user to select the priority contact from the set of target contacts if the set of target contacts has more than one target contact.

16. The device of claim 9, wherein the instructions further cause the at least one processor of the device to:
validate the call command based on an audio length of the command phrase.

17. A non-transitory computer-readable storage medium storing instructions that, when executed, cause at least one processor of a device to perform operations, the operations comprising:
monitoring an audio input for an occurrence of a trigger phrase that is spoken by a user of the device while the device is in a low power mode;
in response to detecting the occurrence of the trigger phrase:
waking the device from the low power mode; and
buffering the audio input while the device wakes up from the low power mode; and
in response to the device waking up from the low power mode, monitoring the buffered audio input for an occurrence of a command phrase that is spoken by the user, wherein the command phrase corresponds to a call command and a call parameter;
in response to detecting the occurrence of the command phrase:

selecting a set of target contacts associated with the device based on respective voice validation scores and respective contact confidence scores, wherein the respective voice validation scores indicate a corresponding likelihood that the call parameter is associated with a corresponding target contact, included in the set of target contacts, and wherein the respective contact confidence scores indicate a corresponding additional likelihood that a user context associated with the user for the call action being directed to the corresponding target contact, included in the set of target contacts; and in response determining that a given voice validation score, of the respective voice validation scores, for a priority contact, included in the set of target contacts, meets a validation threshold and in response to determining that a given contact confidence score, of the respective contact confidence scores, for the priority contact, included in the set of target contacts, meets a confidence threshold:

automatically placing a call to the priority contact.

18. The method of claim 1, wherein the user context comprises one or more of: a recency of last communication, frequency of communication, placement on a favorites list by the user, or relation to a calendar event or appointment for the user.

19. The method of claim 1, wherein the user context comprises one or more of: placement on a favorites list by the user, or relation to a calendar event or appointment for the user.

* * * * *